Feb. 7, 1967   P. E. HYNSON ET AL   3,302,372
GAS SCRUBBING PROCESS AND APPARATUS
Filed April 17, 1964
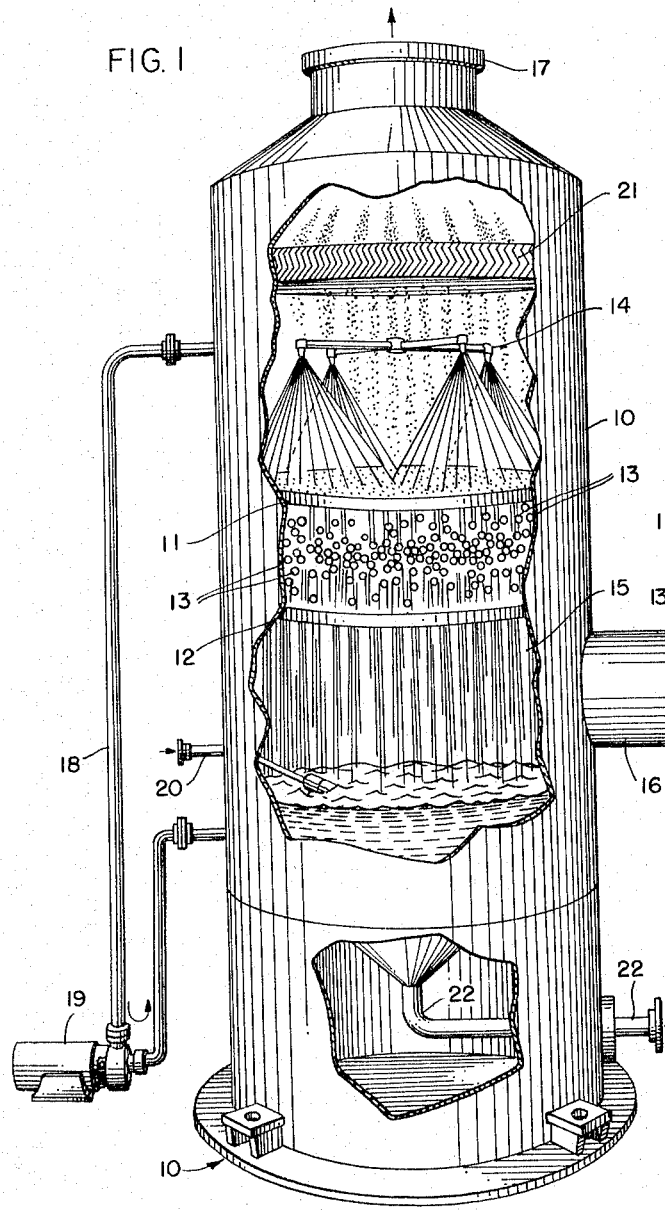
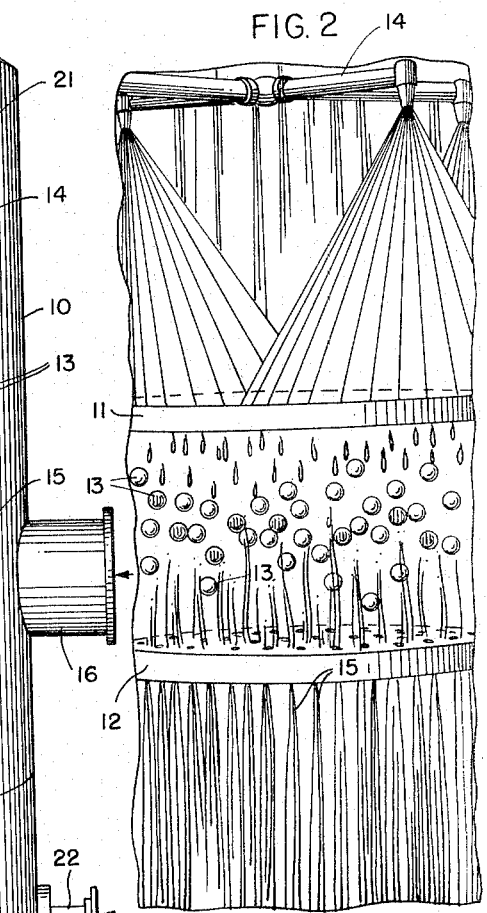
INVENTORS:
PHILLIP E. HYNSON
WILLIAM R. MUSTIAN JR.
BY *Carl C. Batz*
ATT'Y

United States Patent Office

3,302,372
Patented Feb. 7, 1967

3,302,372
GAS SCRUBBING PROCESS AND APPARATUS
Phillip E. Hynson, Winter Haven, and William R. Mustian, Jr., Lakeland, Fla., assignors, by mesne assignments, to Armour Agricultural Chemical Company, a corporation of Delaware
Filed Apr. 17, 1964, Ser. No. 360,525
2 Claims. (Cl. 55—71)

This invention relates to a gas scrubbing process, and more particularly to the scrubbing of combustion gases containing $P_2O_5$ and fluorine through the use of low density balls or spheres suspended in the scrubbing liquid.

In the manufacture of phosphoric acid, it is the practice to employ hot combustion gases for the heating of the phosphoric acid to dehydration temperatures, the combustion gases being brought into direct contact with the phosphoric acid and then removed, bearing fluorine, $P_2O_5$, and $SO_3$, etc. The problem of scrubbing such gases, and removing particularly fluorine, has persisted through the years without effective solution.

We have considered employing known apparatus for the scrubbing of such gases, but such apparatus because of limitations in velocity, flow, etc., has proved unsatisfactory. For example, we have attempted to use a floating-bed wet scrubber in which a bed of smooth, low density spheres is maintained within a scrubbing zone, the spheres being constantly wetted with water and the combustion gases passed through the sphere-containing chamber. In such apparatus, polyethylene balls of about 1½ inches in diameter are supported between perforated plates spaced about 20 inches apart and with the bed of balls having, under static or non-operating conditions, a depth of about 16 inches, and thus filling about four-fifths of the space between the plates. Water is sprayed onto the top of the bed of floating balls, and the combustion gases are directed into the bottom of the chamber to raise and agitate and rotate the balls in the gas stream. As the individual spheres rotate, the scrubbing liquid passes over the surface thereof, and the wetted surfaces absorb soluble gases, while at the same time the rotating spheres are in close contact with each other, tending through friction to keep their surfaces clean.

While we have been informed that the above apparatus has been effective in removing scrubbing gases of various types where the gas velocities were in the range of 300 to 500 feet per minute, it proved to be wholly ineffective in the treatment of combustion gases employed in the manufacture of phosphoric acid where the velocities exceeded 600 feet per minute, and more frequently were in the neghborhood of 1000 to 1250 feet per minute. Under such velocities, the floating balls within the chamber massed against the top perforated plate, causing the density water to overflow, and the process became inoperative. Those skilled in the art with respect to such apparatus advised that the treatment of phosphoric acid combustion gases at the high velocities employed could be handled only in apparatus of much greater dimensions or by reducing in some manner the velocity of the gases below 500 feet per minute.

In a series of tests, applicants discovered, to their surprise, that when one-third to two-thirds of the balls were removed, not only was there effective removal of fluorine, $P_2O_5$, etc., but also gas could be passed through the apparatus in large volume and at high velocity. The operation ceased to be one of a strata or bed of closely-spaced contacting spheres and became one in which the spheres operated randomly at extremely high rotation and in different directions. By increasing the water flow so as to keep the uppermost spheres spaced below the top plate, all of the spheres were free to spin rapidly and move in random paths for effective scrubbing of the gases. Thus, instead of following the suggestion of those working in this field that the apparatus be greatly increased in size and the number of balls be greatly increased, applicants discovered that successful scrubbing was accomplished by proceeding in the opposite direction, namely, by reducing the number of balls and by increasing the water flow so as to maintain the balls below and out of contact with the upper plate.

A primary object, therefore, of the present invention is to provide a process for scrubbing combustion gases containing fluorine and other impurities, etc., while treating such gases at high velocities. A further object is to provide a process in which floating rotating balls are maintained in spaced-apart relation for high spinning action within a current of high velocity combustion gases. Yet another object is to provide apparatus employing low density spheres floated in spaced-apart relation upon high velocity gases while increasing the water flow onto the spheres to wet them and maintain them below the top wall of the scrubbing chamber for free spinning movement. Other specific objects and advantages will appear as the specification proceeds.

The invention is shown, in an illustrative embodiment, by the accompanying drawing, in which—

FIG. 1 is a broken, perspective view of scrubbing apparatus which may be employed in the practice of our invention; and FIG. 2, a broken, greatly enlarged view of a portion of the scrubbing chamber and adjacent portions of the tower.

In the illustration given in FIG. 1, 10 designates a tower casing provided at an intermediate point with spaced perforated plates 11 and 12. Between the plates 11 and 12 are suspended low density spheres 13, such as, for example, polyethylene balls. Water or other cleansing liquid is sprayed through the spray pipes 14 onto the perforated plate 11, and the liquid containing impurities passed downwardly through the apertures in plate 12 forming streams 15. Gas containing impurities is passed into the chamber below plate 12 through inlet 16, and clean gas is withdrawn through the upper outlet 17. Liquid may be recirculated through the line 18 of recirculating pump 19. Liquid make-up may be introduced through the pipe 20. In the top of the tower, we prefer to employ eliminator plates 21. Liquid may be withdrawn from the bottom of the tower through pipe 22. Since the foregoing apparatus is well known, a further detailed description is believed unnecessary. It will be further understood that the apparatus may be used with a series of scrubbing zones rather than with a single scrubbing zone, as illustrated in FIG. 1.

In the prior apparatus tested by applicants, the scrubbing chamber between plates 11 and 12 was almost filled with floating spheres formed of polyethylene, the spheres being 1½ inches in diameter, and in operation the spheres moved upwardly as a bed, with the uppermost spheres engaging the top perforated plate 11. In such elevated position, the bed of packed contacting spheres occupied approximately four-fifths of the space between the plates 11 and 12, and while the spheres rotated under the long contact with the rising gas stream, they also remained in a stratum or bed form, with the balls constantly contacting each other. In the new process and apparatus, we have removed approximately one-half or two-thirds of the balls so as to eliminate the bed or stratum formation, and by increasing the flow of the water, we keep the uppermost balls out of packing contact against the upper plate 11. In other words, the increased water flow rate keeps the balls from closing orifices in plate 11 and maintains them below the plate 11 so that they may spin rapidly and move in random paths. As a consequence of the above changes, we find that the spheres now operate as individual spheres and in random directions and with greatly increased spinning velocities. As a result, without increasing the dimensions of the apparatus, we find that the gas velocities can be increased above 500 feet per minute and above the ranges of 800 to 1200 feet per minute while removing most of the fluorine and P₂O₅ content of the gases.

In the practice of our invention, we prefer to employ lightweight spheres of the type heretofore employed but forming within the scrubbing chamber under static or non-operating conditions a bed of only 6 to 12 inches. We have obtained excellent results when the bed under such quiescent conditions had a height of only 8 inches.

In a typical example, combustion gases which had been utilized in the dehydration or concentration of phosphoric acid and which contained fluorine, $P_2O_5$ and $SO_3$, were passed at a velocity of 1200 feet per minute through apparatus as shown in FIG. 1 so as to suspend an 8 inch bed of 1½ inch diameter polyethylene balls while directing downwardly upon the balls streams of water for wetting the balls. Such operation immediately broke up the bed formation of the balls and spaced them, as illustrated best in FIG. 2, for individual random movement and with high spinning action. At the same time, the water flow was increased to depress the spinning balls below the plate 11 so that they were free to rotate therebelow. For supplying water to the spray device 14, liquid was recirculated through pipe 18 with make-up water being supplied through pipe 20. Contaminated water was withdrawn through pipe 22, and cleaned gases were withdrawn through pipe 17. In such typical example, it was found that over 90 percent of the fluorine was removed, and more than 80 percent of the $P_2O_5$ was removed.

Specific examples illustrative of the process may be set out as follows:

Example I

Combustion gases were discharged into a dehydrator containing a liquid body of phosphoric acid to heat the phosphoric acid and remove water vapor. The combustion gases containing fluorine, $P_2O_5$, $SO_3$, and water vapor were withdrawn at a velocity of 1200 feet per minute and passed through apparatus as shown in FIG. 1, with the quantity of balls in the scrubbing tower occupying a space of 8 inches (under static conditions). The water spray directed upon the perforated plate 11 was adjusted so as to hold the spheres below the plate 11 so that they were free to rotate out of contact with the plate. Gas was withdrawn from the outlet 17 containing less than 10 percent of the original fluorine and less than 20 percent of the original $P_2O_5$ content. In the water body in the chamber below plate 12, the heavier portion containing fluorine and $P_2O_5$ was withdrawn from time to time through pipe 22 while the lighter portion of the liquid was recirculated through pipe 18 back to the spray devices 14.

Example II

The process was carried on as in Example I, with comparable results, employing a static bed of lightweight spheres 13 in a depth of 9 inches. The spheres were formed of polyethylene and had a diameter of 1½ inches.

While in the foregoing specification we have set forth specific steps in considerable detail for the purpose of illustrating our invention, it will be understood that such details may be varied widely by those skilled in the art without departing from the spirit of our invention.

We claim:

1. A process for the concentration of wet process phosphoric acid in which the acid is concentrated by contact with hot combustion gases and the combustion gases containing fluorine removed and in which spinning spheres are confined in a zone space between the upper and lower perforated plates and water is discharged downwardly onto the upper, comprising the steps of maintaining the volume of said spheres at substantially less than one-half the volume of said zone space, passing said gases upwardly through said zone space at a velocity of about 1000–1250 feet per minute, contacting said spheres with said gases and urging said spheres toward said upper plate, simultaneously discharging said water downwardly against said spheres with sufficient force to hold said spheres below and out of contact with said plate in an unstable non-bed formation whereby the spheres move in random paths.

2. The process of claim 1 in which said gas velocity is about 1200 feet per minute.

References Cited by the Examiner
UNITED STATES PATENTS

| | | | |
|---|---|---|---|
| 2,253,261 | 8/1941 | Bacon | 261—94 |
| 2,400,810 | 5/1946 | Clark et al. | 261—94 |
| 3,122,594 | 2/1964 | Keilback | 55—90 X |

REUBEN FRIEDMAN, *Primary Examiner.*

J. W. ADEE, *Assistant Examiner.*